United States Patent [19]

Stroud

[11] Patent Number: 5,425,620
[45] Date of Patent: Jun. 20, 1995

[54] HAT-MOUNTED FAN

[76] Inventor: Kevin J. Stroud, Hazeldene, Whitmore Lane, Woodlands, Wimborne, Dorset BH21 6LS, United Kingdom

[21] Appl. No.: 199,181
[22] PCT Filed: Sep. 4, 1992
[86] PCT No.: PCT/GB92/01621
 § 371 Date: Feb. 24, 1994
 § 102(e) Date: Feb. 24, 1994
[87] PCT Pub. No.: WO93/05297
 PCT Pub. Date: Mar. 18, 1993

[30] Foreign Application Priority Data
 Sep. 4, 1991 [GB] United Kingdom ............... 9118879

[51] Int. Cl.⁶ .................... F04D 29/00; A42C 5/04
[52] U.S. Cl. .................. 416/63; 416/146 R; 417/234; 403/345; 403/360; 403/361; 403/375; 2/171.3; 2/422
[58] Field of Search ........... 416/63, 146 R, 247 R, 416/54; 2/171.3, 422; 403/345, 360, 361, 375; 415/121.2, 183, 185, 208.1, 208.2, 211.2, 213.1, 214.1; 417/234, 424.1

[56] References Cited

U.S. PATENT DOCUMENTS

| | | |
|---|---|---|
| 3,353,191 | 11/1967 | Dahly . |
| 3,546,415 | 12/1970 | Waters ................... 2/171.3 |
| 3,881,198 | 5/1975 | Waters . |
| 4,546,496 | 10/1985 | Lewis . |
| 4,893,356 | 1/1990 | Waters ................... 2/171.3 |

FOREIGN PATENT DOCUMENTS

| | | |
|---|---|---|
| 0709693 | 8/1941 | Germany ............ 416/247 R |
| 3316823 | 11/1984 | Germany . |
| 0041995 | 2/1987 | Japan ................. 416/247 R |
| 1528476 | 10/1978 | United Kingdom . |

Primary Examiner—Edward K. Look
Assistant Examiner—Christopher Verdier

[57] ABSTRACT

An electrically driven fan mounted on the brim or crown of a cap or other head gear is manufactured from plastic, and readily mountable on the head gear without the need for special tools or skills. Dry cell batteries are mounted in the crown of the hat and the impeller of the fan units acts within a recess within the fan unit to pull air downwardly across the face of the user.

8 Claims, 2 Drawing Sheets

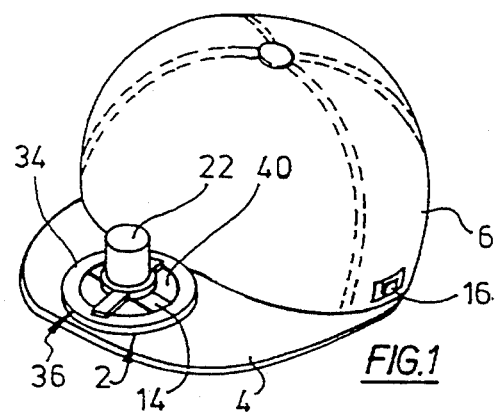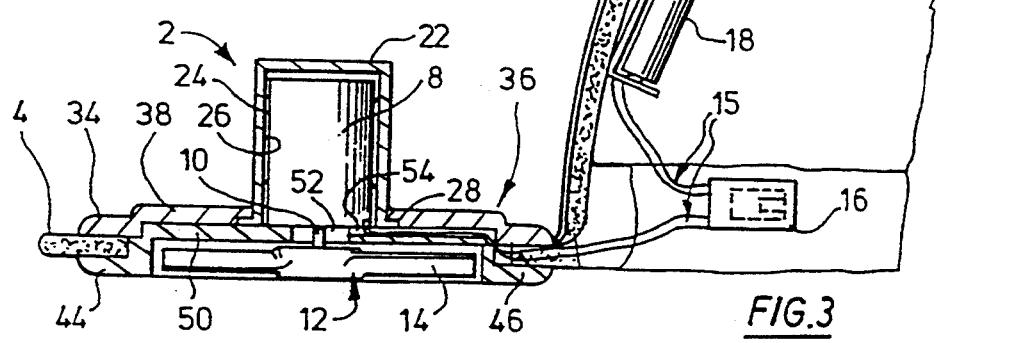

HAT-MOUNTED FAN

This invention relates to fan units for use in conjunction-with hats or any other head gear.

It is known to provide a hand-held fan to create a flow of air across the face of the user and such a fan usually incorporates an electrical motor unit powered by one or more dry cell batteries to cause rotation of an impeller blade. Such a fan is held in the user's hand and therefore that hand is occupied during such use, leaving only one hand free for normal use.

BACKGROUND OF THE INVENTION

1. Field of the Invention

Furthermore, some degree of concentration is needed to maintain the direction of air-flow towards the face, or other parts to be cooled, and when both hands are needed to be in use, the fan must be switched off and set down which may not always be convenient.

2. Description of the Prior Art

British Patent 1528476 discloses a fan for mounting in part of a hat or other head gear wherein two spaced apart disc-like members, each provided with openings through which air may be directed, have mounted for rotation therebetween the impeller of a fan unit. The construction of such a device is complicated as it includes ears or tabs for detachably securing the fan to the selected head gear.

U.S. Pat. No. 4,546,496 discloses a battery-driven fan for attachment to the brim or peak of a hat or cap, and having an adjustable visor for directing the air-flow onto the forehead or face of the user. That arrangement necessitates the visor being mounted before the user's eyes and prevents a clear view forwards. It is generally distracting and objectionable particularly if the user is participating in a sport, e.g. a ball game, at the time. Furthermore, the fan unit is retained on the brim of a hat by means of a resilient retaining ring which does not afford reliable permanent or semi-permanent mounting of the fan unit within the brim of the hat.

It is an object of the invention to provide a fan unit for use in conjunction with a hat or other head gear which does not have the limitations of the above-mentioned devices.

According to the invention there is provided a fan unit adapted for use with an article of head gear and an article of head gear as claimed in the accompanying claims.

SUMMARY OF THE INVENTION

In accordance with an embodiment of the invention there is provided a fan unit adapted for use in combination with an article of head gear comprising a multi-bladed impeller, an electric motor for driving the impeller, the electric motor being mounted within a motor housing which is retained in an inner member part of a first element located on one side of part of the head gear, the first element having an outer rim separate from but connected by radial arms to the inner member part of the first element, a second element located on the other side of the part of the head gear, the second element having a rim separate from but connected by radial arms to an inner disc member part of the second element, the inner disc member having an axial bore through which a drive shaft for the impeller passes, the inner disc member fitting into a recess within the inner member part of the first element and the radial arms of the second element fitting within a channel formed in the radial arms of the first element, the outer rim of the second element being formed with an upstanding annular member adapted to frictionally engage within an annular recess formed in the outer rim of the first member, the arrangement being such that the impeller is rotatable within the inner confines of the outer rim of the second element.

The motor housing may be retained within the recess in the inner member part of the first element by the inner disc member part of the second element.

The motor housing may be cylindrical and have an annular flange which is retained within the recess of the inner member part of the first element.

The annular flange may be retained within the recess of the inner member part of the first element by the inner disc member part of the second element.

Preferably a portion of the head gear is retained between the rims of the first and second elements.

A groove formed within a radial arm of the first or second element affords passage for electrical leads from the electric motor to its power source.

The power source may be one or more dry cell batteries or a solar panel.

The fan may be mounted on the peak or brim of a hat or alternatively on the crown of a hat or helmet.

Opposed planar surfaces of the rims of the first and second elements may be formed with protrusions adapted to penetrate part of the head gear to which the fan is affixed.

The above and other aspects of the invention will become clear from the following description which is given by way of example only with reference to the accompanying drawings in which:

BRIEF DESCRIPTION OF THE DRAWINGS

FIG. 1 is a perspective view of a cap incorporating a fan unit according to one embodiment of the invention.

FIG. 2 is a plan view of the fan unit.

FIG. 3 is a section view on the line III—III of FIG. 2.

FIG. 5 is a section view on the line V—V of FIG. 2.

FIG. 6 is a scrap section view of parts seen in FIG. 4 to a much larger scale.

DESCRIPTION OF THE PREFERRED EMBODIMENT

Figure 4:
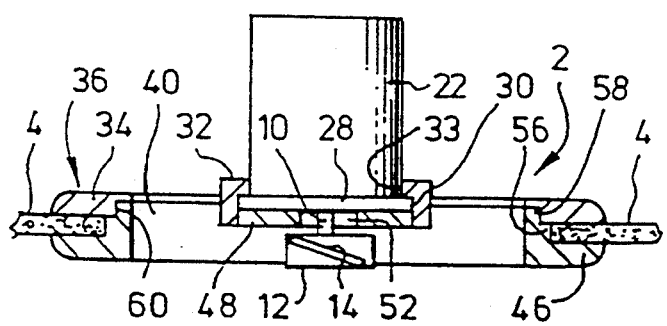
FIG. 4 is a section view on the line IV—IV of FIG. 2.
Figure 7:
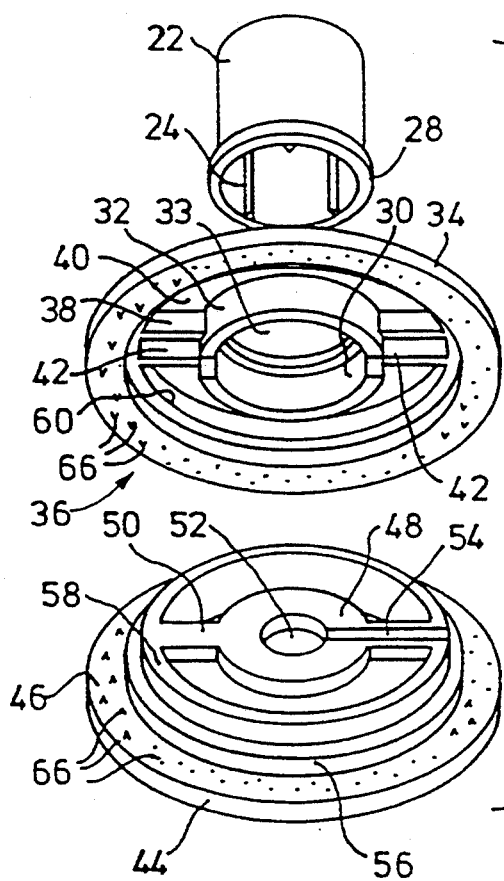
FIG. 7 is an exploded view of parts of the fan unit.

As seen in the drawings, a fan unit designated generally as 2 is attached to the peak 4 of a cap 6 and comprises an electric motor 8 having a drive shaft 10 to which is fixed an impeller 12 having blades 14. The motor is connected by leads 15 via a switch 16 to a dry cell battery 18 mountable in a battery holder 20 which is secured to the crown portion of the cap 6.

The motor is frictionally retained in a motor housing 22 by means of internal ribs 24 formed in a vertical bore 26 within the housing. The housing is generally cylindrically shaped and is formed with an annular projecting flange 28 at its lower end, the rim fitting within an annular recess 30 formed in a boss 32 which is centrally disposed within an annular rim 34 of an upper clamping member 36. The boss 32 has a central bore 33 and is retained in its central disposition with respect to the rim by radial arms 38 which extend between the rim 34 and the boss 32, to form spaces 40 through which air may be caused to flow. The arms 38 are formed with channels 42, the purpose of which will be explained later.

The lower clamping member 44 is formed with an annular rim 46 and a central boss 48 is connected to the rim by radial bars 50. The boss 48 is formed with a hole 52. The drive shaft 10 passes axially through the hole 52 and one of the radial bars 50 is formed with a groove 54 as seen clearly in FIGS. 2 and 5. The lower clamping member is provided with an upstanding annular flange 56 and a further annulus 58 projects upwardly from the flange 56.

The annular rim 34 of the upper clamping member is formed with an annular recess 60, and on assembly of the upper and lower clamping members, the annulus 58 fits within the recess 60 in firm gripping engagement.

Similarly, the boss 48 fits tightly within the recess 30, and the radial arms 50 fit within the channels 42 of the arms 38.

As seen in the enlarged section view of the FIG. 6, the annulus 58 is formed with an outwardly extending portion 62 which fits tightly into a mating recess 64 in the recess 60.

The height of the flange 56 provides a spacer between the lower face of the rim 34 and the upper face of the rim 46, the space being substantially equal to the thickness of the peak or brim 4. As seen in FIGS. 2 and 6, small spikes 66 are formed on the opposing faces of the rims 34 and 46 and, on assembly with the hat, these spikes protrude slightly into the peak.

To prepare a hat for use with a fan unit a hole 5 is first cut in the peak or brim.

The motor 8 is inserted into the housing 22 being gripped therein by the ribs 24 as explained earlier and the housing with its assembled motor are inserted from below through the bore 33 of the boss 32, the annular flange 28 of the housing seating within the recess 30. At this time, the impeller blade is not yet assembled onto the shaft 10 of the motor.

The lower clamping member 44 is next assembled onto the upper clamping member 36 by pressing it upwardly towards the member 36 so that the arms 50 fit within the channel 42 of the arms 38 after ensuring that the leads 15 are located within the groove 54 as seen in FIGS. 2, 3 and 5. The annulus 58 is passed into the recess 60 and the portion 62 of the annulus is snapped into locking engagement with the recess 64, the spikes 66 gripping the upper and lower surfaces of the peak as seen in FIG. 6.

The leads 15, the switch 16 and the battery unit 20, are then assembled conveniently within the crown of the hat, and the impeller 14 is assembled on to the shaft 10.

The fan unit, except for the electrical components, is preferably moulded in a plastics material and the construction as above described, enables the unit to be readily assembled simply and quickly with a minimum of skills or tools.

The simplicity of its construction makes possible low production costs.

Figure 8:
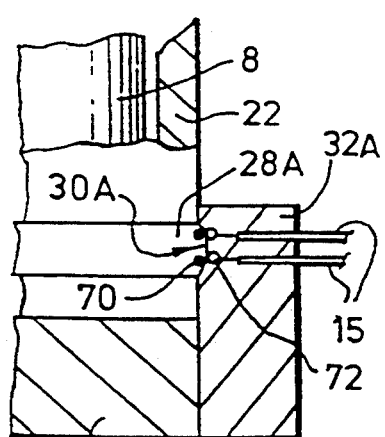
FIG. 8 is a scrap section view of part of an alternative embodiment.

In an alternative arrangement seen in FIG. 8, the annular flange 28 of the motor housing is replaced by a slightly projecting rib 28A which may be snapped into a recess 30A formed in the boss 32A. Thus the motor housing may be snapped into place by inserting it from above. In that arrangement the electrical connections between the battery or other power source and the motor 8 comprise terminals 70 on the projection 28A which contact terminals 72 in the recess 30A.

The protruding motor housing 22 may conveniently be adorned with emblems or toy cartoon characters eg a variety of such toys may be provided to push on to the housing as desired.

Although the invention has been described by way of example as being applied to the peak of a cap it may, without departing from the essence of the invention, be mounted on the peak of a head-band or on part of the crown of a hat or helmet.

The power source has been shown and described as a dry cell battery, but it may instead take the form of a solar panel mounted either on the upper side of the peak or brim or on the crown of the hat or helmet.

Figure 9:
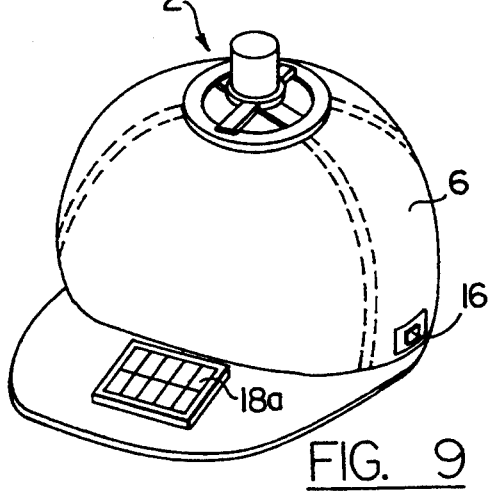
FIG. 9 is a perspective view of a cap incorporating a fan unit and solar panel according to a second embodiment of the invention.

FIG. 9 illustrates a second embodiment of the invention wherein a fan unit 2 is provided in the crown of the hat otherwise similar to that hat of FIG. 1. In this second embodiment of FIG. 9, the source of electrical energy for the fan unit is provided in the form of a solar panel 18b mounted in the hat brim or peak. A switch such as that suggested previously at 16 with reference to the first embodiment of FIGS. 1-6 inclusively is provided between the solar panel 18a and the fan unit 2 as suggested in that first embodiment.

I claim:

1. In an article of head gear the improvement comprising: a fan unit including a multi-bladed impeller, an electric motor for driving the impeller, a housing for the electric motor, said housing including first and second interfitting mounting elements that are adapted to be received in an opening defined for this purpose in the head gear, each mounting element having an outer rim and having an inner portion with radial arms connecting the inner portion to the outer rim, one of said outer rims having an upstanding annular member, and the other of said outer rims defining an annular recess for receiving said upstanding annular member frictionally, said radially extending arms of one of said mounting elements being adapted to fit within a channel formed in the radial arms of the other of said mounting elements.

2. The combination according to claim 1 wherein a portion of the head gear is itself retained between the rims of said first and second elements.

3. The combination according to claim 2 wherein a groove is formed within said radial arms of said first or second element to afford passage for electrical leads from the electric motor to a power source.

4. The combination according to claim 3 wherein said power source is provided in the form of at least one dry cell battery.

5. The combination according to claim 3 wherein said power source is provided in the form of a solar panel.

6. The combination according to claim 1 wherein said fan unit is provided in the brim of the head gear.

7. The combination according to claim 1 wherein said fan unit is provided at the crown of the head gear.

8. The combination according to claim 1 wherein opposed planar surfaces of the rims of said first and second mounting elements are formed with protrusions adapted to penetrate a part of the head gear to which the fan unit is affixed.

* * * * *

UNITED STATES PATENT AND TRADEMARK OFFICE
CERTIFICATE OF CORRECTION

PATENT NO. : 5,425,620
DATED : Jun. 20, 1995
INVENTOR(S) : Kevin J. Stroud It is certified that error appears in the above-identified patent and that said Letters Patent is hereby corrected as shown below: On the title page, item: [56] References:

In the U.S. Patent Documents Data, delete "3,546,415", and insert --3,548,415--

Signed and Sealed this

Seventh Day of November, 1995

BRUCE LEHMAN

Attest:

Attesting Officer

Commissioner of Patents and Trademarks